United States Patent [19]
Anderson

[11] Patent Number: 5,371,543
[45] Date of Patent: Dec. 6, 1994

[54] MONOLITHIC COLOR WHEEL

[75] Inventor: Charles Anderson, Dallas, Tex.

[73] Assignee: Texas Instruments Incorporated, Dallas, Tex.

[21] Appl. No.: 108,095

[22] Filed: Aug. 17, 1993

Related U.S. Application Data

[63] Continuation-in-part of Ser. No. 25,472, Mar. 3, 1993, abandoned.

[51] Int. Cl.⁵ .......................... G02B 5/20; H04N 9/31
[52] U.S. Cl. ..................... 348/270; 348/743; 359/589; 359/891
[58] Field of Search ............... 358/42; 359/580, 583, 359/586, 587, 589, 883, 891; 348/268, 270, 271, 742, 743; H04N 9/31

[56] References Cited

U.S. PATENT DOCUMENTS

| | | | |
|---|---|---|---|
| 2,412,496 | 12/1946 | Dimmick | 359/589 X |
| 4,851,899 | 7/1989 | Yoshida et al. | 358/42 |
| 5,099,359 | 3/1992 | Hrycin et al. | 359/589 X |
| 5,164,858 | 11/1992 | Aguilera, Jr. et al. | 359/587 |

FOREIGN PATENT DOCUMENTS

| | | | |
|---|---|---|---|
| 1-6903 | 1/1989 | Japan | 359/891 |
| 1-262518 | 10/1989 | Japan | 359/891 |

OTHER PUBLICATIONS

IBM Technical Disclosure Bulletin, vol. 11 No. 7, Dec. 1968.

*Primary Examiner*—Mark R. Powell
*Attorney, Agent, or Firm*—Charles A. Brill; James C. Kesterson; Richard L. Donaldson

[57] ABSTRACT

A color wheel comprised of two or more interference filters deposited on or bonded to a substrate 30 without the use of a frame or spokes. Filters 32, 34, and 36 preferably abut and are typically made from multiple layers of materials having different indices of refraction. The color wheel does not require extensive machining or balancing, and is very optically efficient because the duration of single color light periods is maximized. The color wheel does not have a frame or spokes and is therefore more aerodynamically efficient resulting in less work required to spin it and less wind noise.

20 Claims, 2 Drawing Sheets

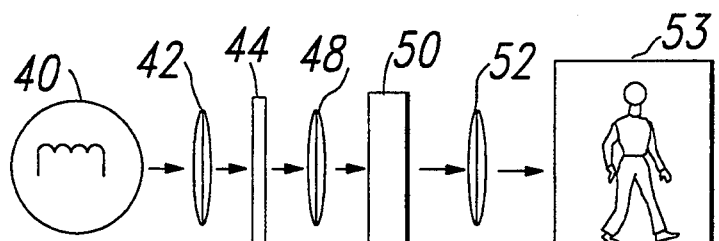
Fig. 4
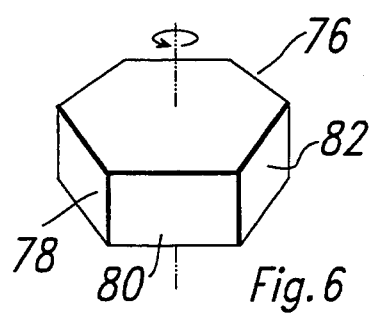
Fig. 6
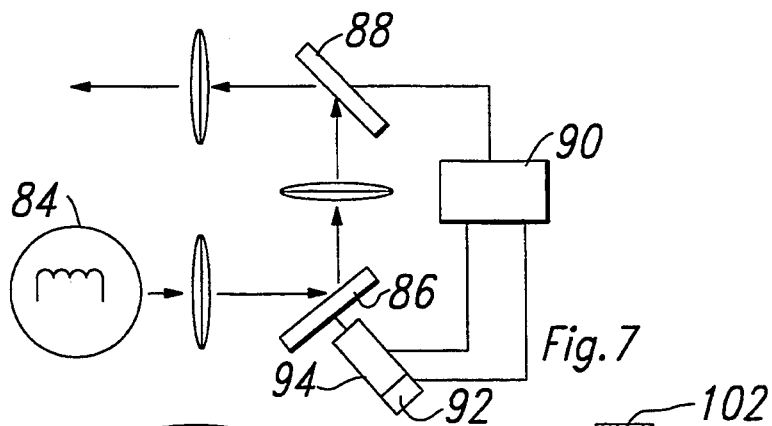
Fig. 5
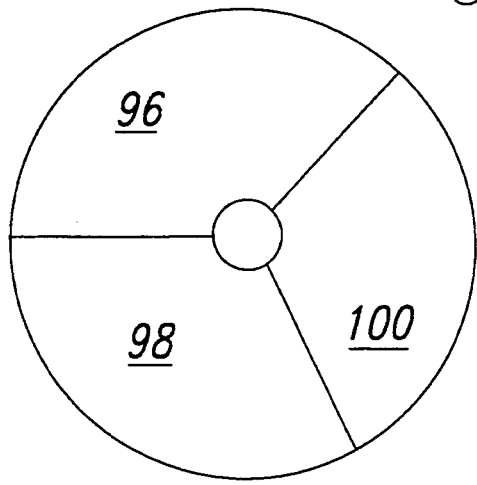
Fig. 7
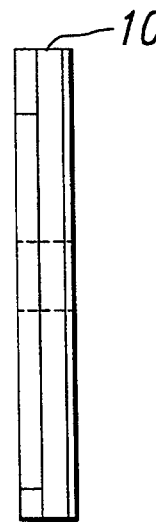
Fig. 8a
Fig. 8b

MONOLITHIC COLOR WHEEL

This is a continuation-in-part of U.S. application Ser. No. 08/025,472, filed Mar. 3, 1993, now abandoned.

FIELD OF THE INVENTION

This invention relates to the field of color visual display systems, more particularly to color wheels for such systems.

BACKGROUND OF THE INVENTION

Full color images can be displayed by creating multiple one-color displays of the appropriate colors. Often this is done by using filters to create three one-color displays. The simplest example involves the use of three independent projection systems, each with its own light source and filter. The filtered light from each of these sources is independently modulated and projected onto a shared screen. The viewer's eye integrates the three simultaneous color images, giving the appearance of colors other than the three displayed.

An alternative to three parallel projectors involves sequentially projecting three one-color images onto the screen at a rate fast enough to allow the viewer's eye to integrate the three successive images. This creates a full-color image with just one light source, modulator, and projector. To implement such a color system requires the filters to be switched rapidly between the display of each image. Typically this is done by mounting the three filters in a wheel configuration using a machined metal or molded plastic frame. The filter wheel, called a color wheel, is then spun in front of a white light source to filter out the three desired colors from the white light.

Color wheels in the prior art have typically been made by holding the three filters in a machined aluminum wheel. Because of the forces generated by spinning the wheel, a metal hub and rim are needed to keep the wheel intact. Metal spokes run from the hub to the rim along the joint between the filters to hold the filters in place. The metal wheel must be precisely aligned and balanced to ensure the smooth operation of the color wheel.

The color wheel described above has several drawbacks due to the construction of the color wheel. First, because the system relies on the filtered light being a single color at all times, the projection system must not operate during the time it takes for each spoke to cross the aperture of the projection system. Therefore, the wider the spokes, the less efficient the display system and the dimmer the resulting image. Secondly, the spinning metal spokes create wind resistance requiring more power to spin the wheel and generating much more noise. Also the cost of the color wheel tends to be high due to the labor involved in building and precisely balancing the wheel.

SUMMARY OF THE INVENTION

According to one embodiment of the present invention a color wheel is formed by attaching interference filters to a disk without the use of a frame or spokes. The disclosed color wheel may be inexpensively manufactured and has the further advantage of high optical efficiency. It is still a further advantage that the disclosed color wheel may be more aerodynamic and therefore easier to spin, resulting in less wind noise.

BRIEF DESCRIPTION OF THE DRAWINGS

FIG. 3b is an edge view of the color wheel of FIG. 3a.

FIG. 4 is a schematic view of a projection display system having a color wheel according to a first embodiment of the present invention.

FIG. 5 is a schematic view of a camera system having a color wheel according to a first embodiment of the present invention.

FIG. 6 is a perspective view of a reflective polygonal mirror according to a second embodiment of the present invention.

FIG. 7 is a schematic view of a projection display system having a reflective color wheel according to a third embodiment of the present invention.

FIG. 8a is a plan view of a laminated color wheel according to a fourth embodiment of the present invention.

FIG. 8b is an edge view of the color wheel of FIG. 8a.

DETAILED DESCRIPTION OF THE PREFERRED EMBODIMENTS

One method of filtering light is through the use of interference filters. Interference filters consist of a substrate on which is deposited one or more layers of an optical coating. By careful selection of the layer thickness and material, the transmission and reflection properties of the device become highly frequency dependent. Such filters are sometimes called dichroic filters and are essentially non-absorbing color selective beamsplitters that transmit and reflect particular wavelengths of light. Several types of filters may be constructed including band-pass, band-stop, long-pass, and short-pass.

Interference filters operate by creating either constructive or destructive interference between reflected light waves. As light travels across the interface between two non-absorbing media, it is either reflected by the interface, or transmitted through the interface. Decreasing the amount of light reflected will increase the amount of light transmitted. Because reflection and transmission are dependent on the index of refraction of the materials involved, optical coatings having different indices of refraction may be selected to alter the reflection and transmission properties. At normal incidence, the reflectance is given by equation 1 below.

$$R = \left[ \frac{n_2 - n_1}{n_2 + n_1} \right]^2$$

Figure 1:
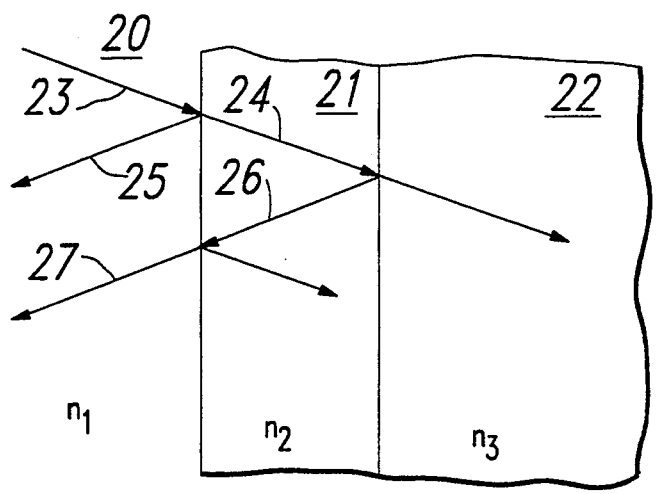
FIG. 1 is an illustration of a light wave being transmitted and reflected by the interfaces between air, an optical coating, and a glass substrate.

Where:
R = Reflectance
$n_1$ = Index of refraction in first medium
$n_2$ = Index of refraction in second medium If three media are present, a reflection will occur at each interface. FIG. 1 shows the reflected and transmitted waves as an incident light wave 23 passes from a first medium 20, through an optical coating 21, and into a third medium 22. For illustrative purposes, the first medium 20 is chosen to be air, $n_1=1.0$, the second medium is chosen to be magnesium fluoride, $n_2=1.38$, and the third medium 22 is chosen to be glass, $n_3=1.5$. Each time the reflected wave is reflected by an interface with a medium having a higher index of refraction, it undergoes a 180° phase change. For an anti-reflection coating, the thickness of coating 21 is chosen to be equal to ¼ of the wave length of the light, or an odd multiple thereof, so that the reflected waves 25 and 27 will be 180° out of phase and cancel each other.

Figure 2:
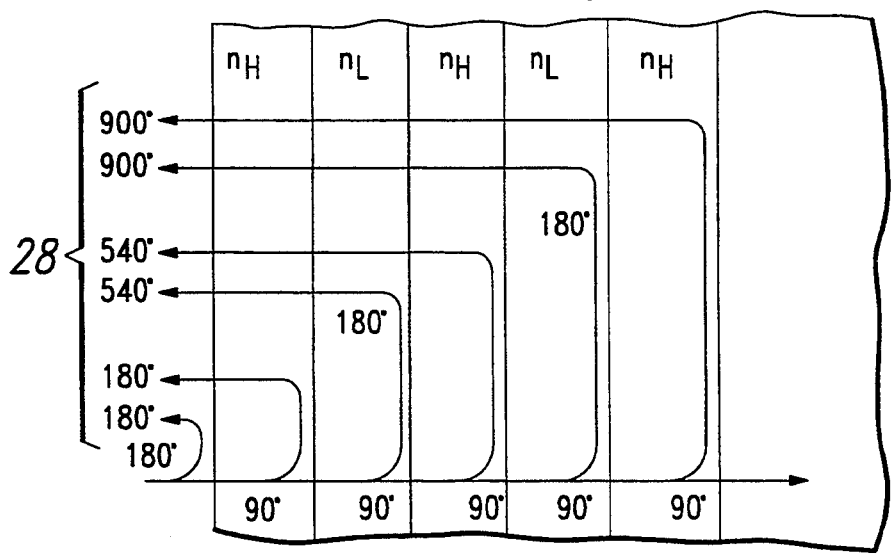
FIG. 2 is an illustration of a light wave being transmitted and reflected by a five-layer multiple periodic optical filter.

More complex filters often make use of multiple layers of coating material. Because the layers are typically quarter-wave layers that alternate between materials with a high index of refraction and materials with a low index of refraction, they are often called multilayer periodic systems. FIG. 2 illustrates a five layer coating used as a reflector. In FIG. 2, the paths of the reflected waves 28 are shown figuratively for illustrative purposes. Each reflection from a low to high index interface results in a 180° phase change. All of the reflected waves 28 have a phase shift that is an odd multiple of 180° resulting in constructive interference and a large reflected wave.

The response of an interference filter depends on the frequency and angle of incidence of the incident light. At a given angle of incidence, an optical coating is only ¼ wavelength thick for one frequency. Therefore the reflected waves only interfere perfectly at that frequency. The reflection of other frequencies may be either enhanced or diminished. To build more complex optics, multiple filters may be sequentially deposited on the substrate, each filtering a different portion of the spectrum.

Optical coatings may be applied by several means including evaporation and sputtering. Evaporative coating involves heating a sample of the material enough to vaporize it. The vapor is then allowed to condense on the substrate being coated. Sputtering involves holding the cooled substrate and a target of the material to be deposited in close proximity inside a plasma chamber. The plasma bombards the target, freeing particles of the target material. These particles then condense on the cooled substrate. The thickness of optical coatings may be tightly controlled by monitoring the coating during the deposition process. Materials used in optical coatings include, among others, zirconium dioxide, zinc sulfide, silicon dioxide, titanium dioxide, titanium tungsten, magnesium fluoride, cerium fluoride.

According to a first embodiment of the present invention, a number of filters, typically three, are individually deposited on a glass substrate. While each filter is deposited, the remainder of the substrate is masked off. All filters will typically be equal in size, although some applications may require the filters to be different sizes, or to be sized proportionally to each other. It is preferable that the filters abut because a gap or overlap between the filters will lengthen the time that the light is not monochromatic. As with prior art color wheels, blanking is required during any period when more than one color of light enters the aperture. Therefore, filter gaps and overlaps will require additional blanking and reduce the optical efficiency of the display system. The disclosed color wheel has the potential of being more aerodynamic than a color wheel of the prior art, therefore requiring less energy to spin the wheel and generating less wind noise. The disclosed color wheel may not require balancing, allowing a significant reduction in manufacturing effort and cost.

Figure 3A:
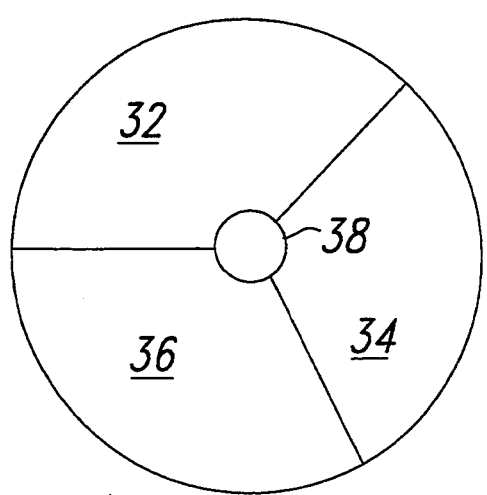
FIG. 3a is a plan view of a monolithic color wheel according to a first embodiment of the present invention.

FIG. 3a shows a monolithic color wheel according to a first embodiment of the present invention. Substrate disk 30 may be any material that is both optically transparent over at least a portion of the spectrum, typically the visible spectrum, and is able to withstand the heat generated by the light that is focused onto the color wheel. Examples of such materials include quartz, glass, and some plastics such as acrylic. Typically the substrate is an optical glass such as Tempax or 7740 Pyrex.

Three color filters 32, 34, and 36 are formed on the substrate disk 30. Typically each filter is equally sized and spans 120° of the disk. Preferably the filters abut. In certain systems it may be desirable to construct fewer filters or to construct additional filters. For this example, the filters are chosen to transmit the three primary colors red, green, and blue. Typically filter 32 is a long-pass filter and transmits less than 1% of the incident light from 370 to 550 nM, 50% of the incident light at 600 nM, and a minimum of 80% of the incident light from 620 to 730 nM. Typically filter 34 is a short-pass filter and transmits less than 1% of the incident light from 540 to 750 nM, 50% of the incident light at 505 nM, and a minimum of 80% of the incident light from 390 to 480 nM. Typically filter 34 is a band-pass filter and transmits less than 1% of the incident light from 380 to 460 nM and from 610 to 730 nM, 50% of the incident light at 505 and 575 nM, and a minimum of 80% of the incident light at 540 nM. The filters could be chosen to transmit light outside of the visible spectrum, and could be band-stop filters instead of band-pass filters. Any filter that can be constructed on the substrate and will withstand the heat generated by the light source could be used.

Figure 3B:
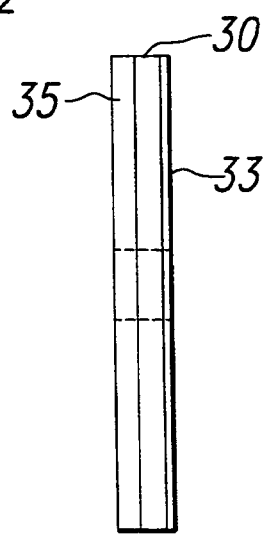

FIG. 3b is an edge view of a monolithic color wheel according to a first embodiment of this invention. The color wheel may have an anti-reflective coating 33 applied, typically to the side opposite the color filters 35. The wheel is typically six inches in diameter, ⅛ inch thick, and has a ⅜ inch hole in the center to allow the wheel to be mounted on a motor shaft.

A color filter wheel according to a first embodiment of the present invention is shown installed in a projection system in FIG. 4. Light from light source 40 is focused by lens 42 onto the color wheel 44. It is advantageous to place the color wheel 44 at the focal point of lens 42 to reduce the area of the color wheel 44 illuminated. As the size of the area illuminated increases, the proportion of time that the illuminated area includes more than one color increases. The efficiency of the projection system is limited by the proportion of time that the illuminated area includes more than one color, because the projector typically cannot operate during any period when more than one color is produced by the color wheel. The disadvantage of placing the color wheel at the focal point is that the heat generated by light absorption is localized. This results in much higher temperatures, especially if the color wheel is stopped. The color wheel may be placed away from the focal point in order to tradeoff efficiency for lower thermal stress.

As the motor 46 turns the color wheel 44, light of the desired colors will be transmitted to lens 48. Lens 48 focuses the light onto the spatial light modulator 50 (SLM). The SLM could be any type of device capable of modulating the light such as a digital micromirror device (DMD), or a liquid crystal device (LCD). For the purposes of illustration, a transmissive liquid crystal device is shown. After being modulated, the light is focused by lens 52 into an image to be viewed, typically on screen 53. The controller 54 monitors the position of the color wheel in order to synchronize the signals sent to the SLM with the colored light. The position of the wheel can be monitored either by tracking the position of motor 46 or by using a sensor 56 to track the colors or markings on the wheel.

Although the disclosed color wheel has so far been discussed in terms of color projection systems, there are many other applications for such a device. For example the wheel could be used to filter light entering a camera, as shown in FIG. 5. This would allow a color camera to use only one imager for all three colors. Light 58 from the object is focused by lens 60 and passes through the aperture 62 of the camera. After passing through the aperture 62, the light passes through another lens 64 and the color filter wheel 66. The light then passes through another lens 68 and illuminates a charge-coupled device (CCD) 70 or any other photo-receptor. A controller 72 monitors the output of the imager and the position of the color wheel 66 to obtain information about the scene. The position of the color wheel could be monitored either by using sensor 75 or by monitoring the position of the motor 74. Sensor 75 could detect the color transitions as the filter rotated past the sensor, or simply detect a mark used to indicate a point on the filter, such as white paint on the edge of the color wheel between the blue and red filters.

The filters in the above example could be selected to cover only a small portion of the spectrum with each having a very narrow passband. This would be useful in machine vision applications to allow the machine to distinguish between close shades of a color. For example, by using several different orange filters a machine could sort oranges by color. Another example would be to select filters in the infra-red region to help a forward looking infra-red (FLIR) system distinguish between valid targets and decoys.

Other embodiments of the disclosed invention uses reflective filters instead of the transmissive filters previously discussed. Reflective filters allow the use of non-transparent substrates. Reflective filters could be constructed on either a wheel-shaped substrate as previously discussed, or on substrates of other shapes. An example of an alternate substrate shape, according to a second embodiment of this invention, is shown in FIG. 6. FIG. 6 shows a polygonal mirror 76 similar to those used in various types of scanners. Each face 78, 80, 82, of the mirror 76 could be a filter of a different color.

FIG. 7 shows a reflective color wheel according to a third embodiment of this invention used in a DMD display system. Light from source 84 is focused onto color wheel which reflects the light towards a spatial light modulator, in this case a DMD 88. DMD 88 selectively reflects the light to form an image that can be viewed directly, or by projecting the image onto a screen. Controller 90 monitors a position sensor 92 on the motor 94 to ensure that the motor stays synchronized with the spatial light modulator. The use of a reflecting color wheel with a reflecting spatial light modulator in FIG. 7, and a transmissive color wheel and spatial light modulator in FIG. 4 is coincidental. Either type of wheel may be used with either type of spatial light modulator to form an image that may be either viewed directly or projected onto a screen.

A fourth embodiment of the disclosed invention is shown in FIGS. 8a and 8b. This embodiment teaches a laminated color wheel using separate filters 96, 98, and 100 that are bonded onto the disk 102. Preferably, the filters are bonded to the substrate disk 102 using a continuous layer of a high temperature, optically transparent adhesive such as Norland NOA-61or equivalent. This embodiment allows the filters to be separately manufactured, possibly in sheets, and then bonded to the disk. The filters could be manufactured on any material that meets the optical and environmental requirements of the color wheel. Examples of suitable materials include glass, plastic, or quartz. This embodiment will have some of the advantages of a frameless or spokeless design and may be easier to manufacture because masking is not required during the deposition of the filters. Because the filters are typically built on their own substrate, a laminated color wheel will usually be thicker and heavier than a monolithic color wheel according to a first embodiment of this invention.

Thus, although there has been disclosed to this point a particular embodiment for a monolithic color wheel, optical projection system and optical camera system, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A one-piece color filter wheel comprised of:
   a substrate; and
   at least two abutting interference filters supported by said substrate, each of said interference filters comprised of a least one optical coating layer.

2. The color wheel of claim 1 wherein said substrate is glass.

3. The color wheel of claim 1 wherein said substrate is plastic.

4. The color wheel of claim 1 wherein said substrate is acrylic.

5. The color wheel of claim 1 wherein said substrate is quartz.

6. The color wheel of claim 1 wherein said interference filters are transmissive.

7. The color wheel of claim 1 wherein said interference filters are reflective.

8. The color wheel of claim 1 having three said interference filters, said interference filters being transmissive and comprised of multiple layers of materials having varying indices of refraction, said materials vacuum deposited on said substrate, wherein said substrate is glass.

9. The color filter wheel of claim 1 wherein said substrate comprises a first side and a second side, said substrate having interference filters deposited on said second side and an anti-reflective coating deposited on said first side.

10. A color filter wheel comprised of:
    a primary substrate;
    at least two secondary substrates; and at least two interference filters comprised of at least one optical coating layer deposited on said secondary substrates, said interference filters attached to said primary substrate without the use of a frame or spokes.

11. The color wheel of claim 10 wherein said primary substrate is glass.

12. The color wheel of claim 10 wherein said primary substrate is plastic.

13. The color wheel of claim 10 wherein said primary substrate is acrylic.

14. The color wheel of claim 10 wherein said primary substrate is quartz.

15. The color wheel of claim 10 wherein said interference filters are transmissive.

16. The color wheel of claim 10 wherein said interference filters are reflective.

17. The color wheel of claim 10 wherein said at least two filters are comprised of a red, a green, and a blue filter.

18. The color filter wheel of claim 10 wherein said primary substrate comprises a first side and a second side, said primary substrate having said interference filters attached to said second side and an anti-reflective coating deposited on said first side.

19. A motorized color filter wheel system comprising:
- a substrate having a first surface, a second surface, and an axis perpendicular to said first and second surfaces;
- a source of light;
- at least two interference filters, each of said interference filters having a unique optical transmission bandwidth, wherein said first surface of said substrate is comprised of at least two substantially abutting regions, each of said at least two regions supporting one of said interference filters; and
- a motor attached to said substrate for spinning said substrate about its axis, wherein said light is focusable onto a point on said substrate such that each of said interference filters passes through said point during each revolution of said substrate.

20. The color wheel system of claim 19 wherein said at least two filters are comprised of a red, a green, and a blue filter.

* * * * *